Sept. 30, 1969　　　　　L. N. MERTZ　　　　　3,469,923
OPTICAL DEVICE FOR DETECTING A RELATIVELY
LOW INTENSITY SPECTRUM LINE
Filed March 1, 1965　　　　　　　　　　　　2 Sheets-Sheet 1
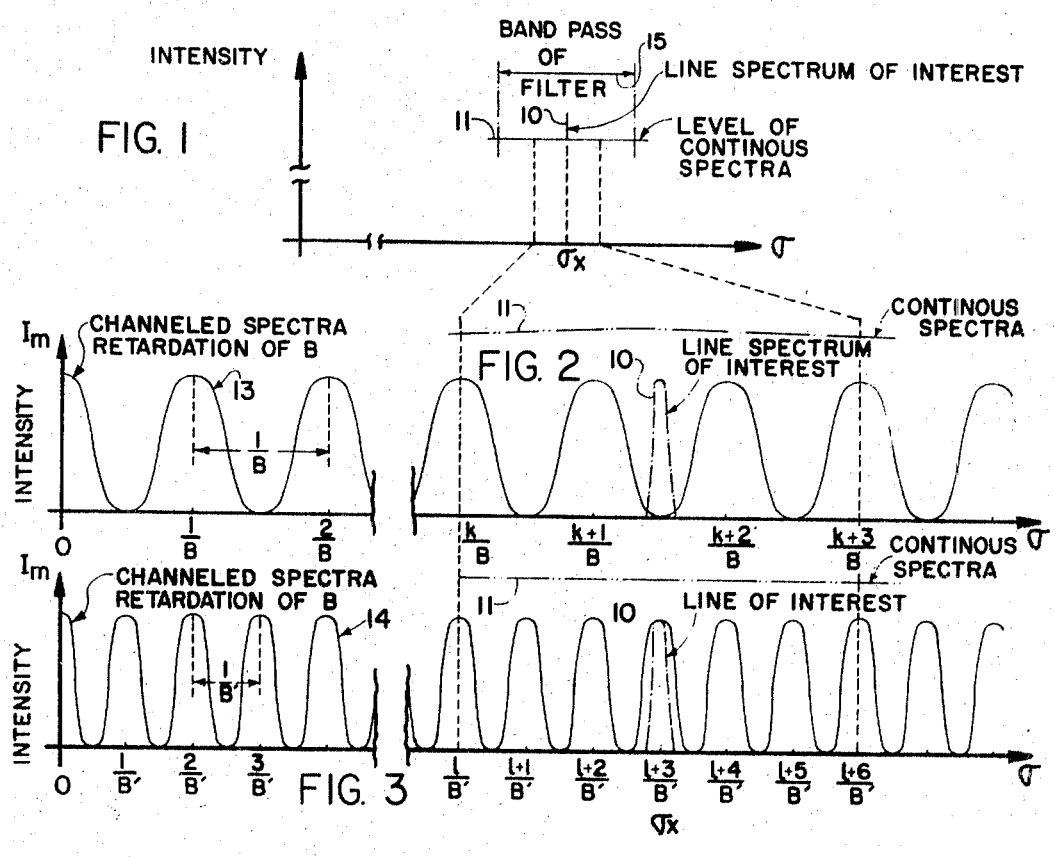
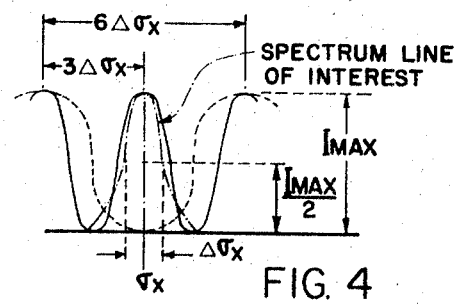
FIG. 4
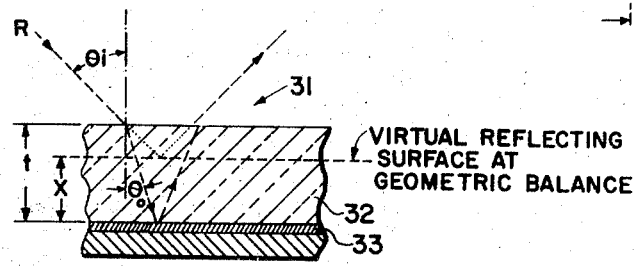
FIG. 6
INVENTOR
Lawrence N. Mertz
BY Wilfred J. Baranick
ATTORNEY INVENTOR
Lawrence N. Mertz
BY Wilfred J Baranick
ATTORNEY United States Patent Office 3,469,923
Patented Sept. 30, 1969

3,469,923
OPTICAL DEVICE FOR DETECTING A RELATIVELY LOW INTENSITY SPECTRUM LINE
Lawrence N. Mertz, Lexington, Mass., assignor to Block Engineering, Inc., Cambridge, Mass., a corporation of Delaware
Continuation-in-part of application Ser. No. 374,416, June 11, 1964. This application Mar. 1, 1965, Ser. No. 440,662
Int. Cl. G01b 9/02
U.S. Cl. 356—106                                    7 Claims

ABSTRACT OF THE DISCLOSURE

By field-widening a Michelson interferometer the spectrum is encoded in channel spectra while retaining the inherent large light transmission qualities of the instrument. Provision is made for moving the channels which modulates and spectral discontinuity while a background continuum remains constant, thus line spectra can be discriminated from the background with great sensitivity.

---

This invention relates to method and apparatus for monitoring the intensity of a relatively weak spectrum line in the presence of a relatively strong continuum background.

This application is a continuation-in-part of my copending application Ser. No. 374,416 filed June 11, 1964, now abandoned.

The problem to which the invention addresses itself is that of separating spectral detail from background. This problem has long been recognized in the field of spectroscopy and has to do with the detection and measurement of discontinuities such as emission or absorption lines, band heads, or the like, which exist over an extremely narrow wavelength band in a substantially continuous background. The discontinuity may, for example, be an emission of greater intensity at one particular wavelength (i.e., of an extremely narrow range of wavelengths) where the intensities of radiation at wavelengths on both sides of the one at which the greater radiation occurs are substantially equal, at least in relation to the difference in intensity between single wavelength and the other wavelengths which constitute the background. Likewise, the phenomenon of interest may be significantly greater spectral absorption at one particular point in the spectrum as distinguished from the substantially continuous nature of the spectrum at wavelengths on either side of the one where the phenomenon occurs.

Using conventional spectrographic techniques, filters may be used to isolate the portion of the spectrum which is allowed to pass and be measured. Thus, a relatively narrow band of wavelengths which include the one which differs from its neighbors, may be passed for measurement, but a certain amount of background (i.e., the continuous portion of the spectrum) is by necessity also passed with the wavelength of interest. A second filter may be used to pass and measure a similarly narrow band of wavelengths from the continuous spectra near, but not inclusive of, that portion which includes the wavelength of interest. Proceeding on the assumption that the portion of the continuous spectra passed through the first filter with the wavelength of interest is equal to the continuous spectra passed by the second filter, the latter may be subtracted from the former and the result will theoretically provide a measurement of the phenomena at the wavelength of interest. Certain serious disadvantages are associated with such a technique, however, due to fluctuations and other inconsistencies which are nearly always present in the continuous spectra. As set forth in the following detailed disclosure, the present invention provides novel methods and means for greatly improving the ability to separate spectral detail from a relatively strong continuous spectra.

The methods and apparatus of the present invention could be used to great advantage, for example, during the production of a batch of metal to specifications requiring a predetermined amount of trace element since the intensity of the radiation emitted by the atoms of the element due to thermal excitation, and hence their relative numbers, could be determined while the metal is still in its molten state. Spectral intensity measurements of line emission under these circumstances present a difficult problem because of the relatively low intensity of the emitted radiation in the presence of a relatively high intensity continuum radiation surrounding the emission line of interest. Conventional slit-type spectrometers can spectrally isolate an emission line from the spectral background, but at the high resolving power required to minimize background radiation, the slit spectrometer can pass only a very small amount of energy. The resultant signal obtained is the sum of the continuum and the emission line, and it is quite difficult to separate a weak line from what amounts to a great deal of system noise. On the other hand, interferometric apparatus, of which the Michelson and Fabry-Perot interferometers are examples, have large apertures instead of narrow slit openings, and can pass relatively greater amounts of energy.

Conceptually, the invention is based on the recognition that the transmission of a Michelson interferometer adjusted for nonzero retardation is a cosine-squared function of wavenumber, the period of which is functionally dependent upon the path difference (retardation) between the two optical paths of the interferometer; and that modulation of the transmission, achieved by modulating the retardation, will cause no change in the amount of light transmitted when the frequency spectrum of the light input is continuous and of constant amplitude (continuum). When a spectral line is present in the continuum, however, modulation of the retardation between limits which shift, between zero and 100%, the transmission of energy at the wavelength of the line, causes a change in the amount of light transmitted. Such change occurs at the frequency at which the retardation is modulated; and, the amplitude of the change will be proportional to the intensity of the line. Detection of the change and determination of its amplitude are readily accomplished using AC circuitry. In this manner, even a relatively weak spectral line in the presence of a relatively weak spectral line in the presence of a relatively continuum background can be effectively measured.

It will be readily understood by those skilled in the art, in view of the following detailed disclosure, that the techniques or methods for discriminating spectral detail are suited for employment in a great variety of applications. One such application has already been suggested herein and a number of other possible uses will be pointed out in more detail later in the description. It is specifically pointed out that the present invention comprehends employment of the methods and apparatus in combination with other conventional apparatus such as prisms, laser devices, grating spectrographs, flame photometers and many others in carrying out the desired objects. It is also to be understood that the invention is not to be limited by its manner of employment and many specific uses are contemplated although, for purposes of brevity, not enumerated separataely in detail.

Accordingly, it is a principal object of the present invention to provide novel and improved methods for separating spectral detail from a background of continuous spectra, and to provide apparatus useful in carrying out such methods.

A further object is to provide a novel method and means for conveniently and accurately monitoring the relative concentrations of certain impurities, trace elements, or the like, in a mass of molten metal.

Another object is to provide interferometric apparatus which is capable of spectral line discrimination under the circumstances described.

Other objects are: to provide apparatus for spectrographic purposes wherein a spectral line of interest is substantially 100% modulated to produce an AC signal indiactive of the spectral detail at the wavelength of the line; to provide means for optimizing the aforementioned AC signal by eliminating harmonics of the fundamental frequency of modulation; and to provide novel techniques, based upon the method and apparatus described, which make possible and practical such things as continuous monitoring of the carbon content of a melt of scrap steel while the carbon and other impurities are being removed in an oxygen furnace. The last-mentioned object is one of many specific functions within the framework of the invention which could not be satisfactorily performed by previous techniques or apparatus.

Other objects of the invention will in part be obvious and will in part appear hereinafter.

The invention accordingly comprises the apparatus possessing the construction, combination of elements and arrangement of parts and the method involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a plot of intensity as a function of wavenumber, and showing a low intensity line spectrum in the presence of a relatively intense continuum;

FIGS. 2 and 3 are plots of transmission intensity as a function of wavenumber for a Michelson interferometer having a different values of retardation, such plots being similar to those obtained with certain other types of interferometers, both true and simulated, where the period of the transmission intensity is functional dependent upon a variable parameter associated with the interferometer;

FIG. 4 shows a normalized spectrum line of finite width superimposed upon channel spectra associated with an interferometer whose variable parameter has two particular values;

Figure 5:
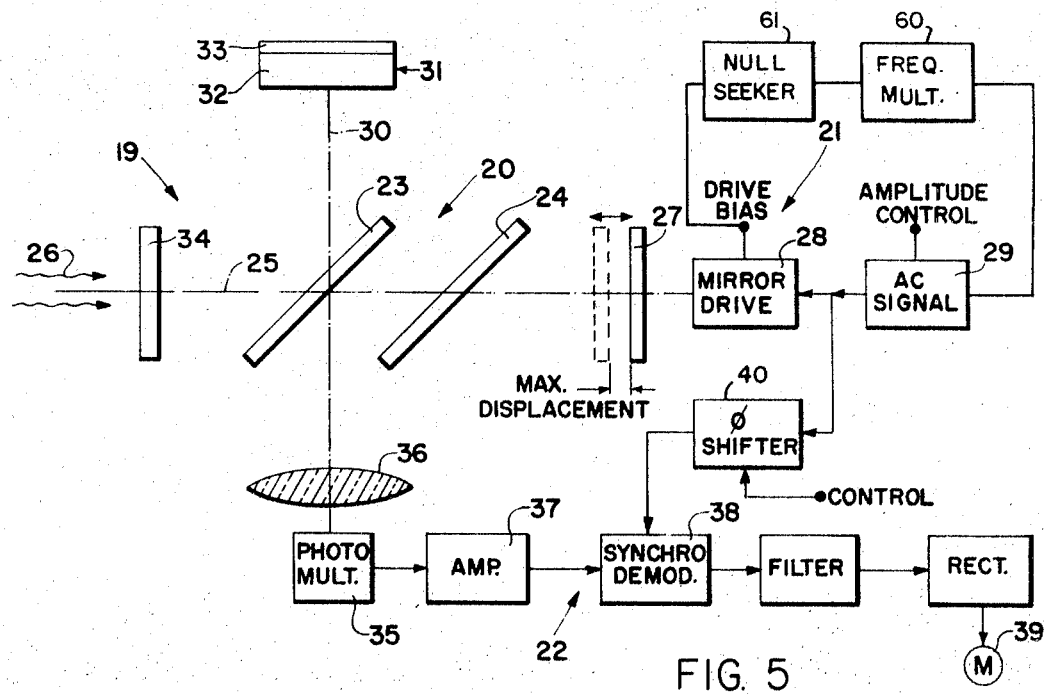
FIG. 5 is a block diagram of a Michelson interferometer showing the circuitry associated with periodically changing the retardation (which constitutes the variable parameter) and monitoring the output such that discrimination of a line spectrum in the presence of a background continuum can be achieved.
Figure 7:
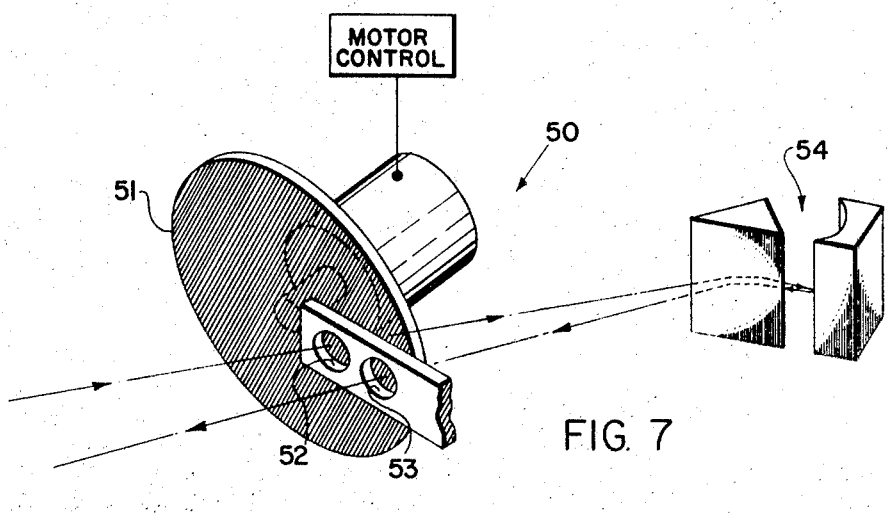

FIG. 6 is a sectional view of the stationary mirror of the Michelson interferometer shown in FIG. 5 for the purpose of illustrating the manner in which large retardations can be achieved without significantly changing the geometric lengths of the arms of the interferometer; and FIG. 7 is a schematic showing of a device, termed a "mock interferometer" which has the ability to produce channeled spectra.

Referring now to FIGURE 1, reference numeral 10 designates a relatively low intensity spectrum line at a wavelength $1/\sigma_x$ that is present in a relatively high intensity continuum represented by background 11. FIGURE 1 is illustrative of the spectral output, over a limited range of wavelengths, of the output of a furnace containing, for example, an incandescent mass of molten steel to which a small amount of copper has been added for metallurgical reasons. Thus $\lambda_x$ may be 5218.202 angstroms, and the problem may be to determine the intensity of the line due to thermal excitation of the copper atoms such that a measure of the number of such atoms present in the melt can be obtained.

Before explaining how the present invention can be used to determine this intensity, it may be helpful to review certain elementary principles of physical optics. For two coherent waves of intensities $I_1$ and $I_2$ of the same frequency and traveling in the same direction, the resultant wave has an intensity I related as follows:

$$I = I_1 + I_2 + 2(I_1I_2)^{1/2} \cos \delta \qquad (1)$$

where $\delta$ is the phase difference between the two waves $I_1$ and $I_2$. If the phase difference arises because of different path lengths, as in a Michelson interferometer, the following holds:

$$\delta = 2\pi B/\lambda \qquad (2)$$

where B is the difference in path length or retardation and $\lambda$ is the wavelength of the two waves. By trigonometric identities, Equation 1 reduces to:

$$I = I_1 + I_2 - 2(I_1I_2)^{1/2} + 4(I_1I_2)^{1/2} \cos^2 \frac{\pi B}{\lambda} \qquad (3)$$

From this, it can be seen that minima occur at $$\cos^2 \pi B/\lambda = 0$$

and maxima at $\cos^2 \pi B/\lambda = 1$. The period can be obtained from considering the constraints on the arugment of the cosine squared term.

For maxima:

$$\frac{\pi B}{\lambda} = m\pi \qquad (4)$$

wherein $m$ = integer, so that $$\frac{1}{\lambda} = \sigma = \frac{m}{B} \qquad (5)$$

Calling $\Delta\sigma_p$ the period in wavenumbers, one obtains $$\Delta\sigma_p = \frac{m_2}{B} - \frac{m_1}{B} = \frac{1}{B} \qquad (6)$$

Applying this to a Michelson interferometer, one finds that for practical purposes $I_1 = I_2$ and that the wavelength transmission response of this device (i.e., the transmission intensity as a function of the reciprocal of the wavelength) is in the form of a squared sinusoid (i.e., a cosine squared function), the period of which is functionally dependent upon a variable parameter of the interferometer (i.e., the retardation). FIGS. 2 and 3 show at 13 and 14 respectively, plots of Eq. 3 under the condition that $I_1 = I_2$ (so that at the maxima, transmission is $I_m$; and at the minima, transmission is zero) for two values of retardation B and B' where $B' = 2B$. The nature of the cosine squared curve is such that an increase in the period increases the density of the maxima over the spectral range of interest designated at 15 in FIGURE 1, which appears to cause a lateral shift of the wavenumbers at which maxima occur. Thus, if B is chosen such that line 10 at wavenumber $\sigma_x$ falls at a minima of curve 13, as shown in FIG. 2, line 10 will fall on a maxima of curve 14 as shown in FIG. 3, provided $B' = 2B$. By modulating the retardation between the limits B' and B at a frequency that is large in comparison to fluctuations in the spectral response 10 and 11, it follows that line 10 is 100% modulated in that substantially all of the energy in the line is transmitted at one limit and none is transmitted at the other. However, there are many maxima within band 15, and about 50% of the background energy contained within the band is transmitted at all times regardless of the modulation of the retardation.

Actually, the energy transmitted when the retardation has the value B is greater than when the retardation has the value B' by an amount equal to the energy content of line 10 (assuming the background is symmetrical about the line). Therefore, a photoresponsive device receiving energy transmitted in accordance with transmission curves 13 and 14 would have an A-C output whose frequency is the same as the modulating frequency of the retardation, and whose amplitude would be proportional to the intensity (amplitude) of the line. An absolute radiometric value for the signal can be obtained by calibrating against a line of known intensity.

The minimum values of retardation necessary to assure reasonably accurate results can be obtained by considering FIG. 4 which shows line 10 at wavenumber $\sigma_x$ as having a half-intensity width $\Delta\sigma_x$. Obviously, the period of the cosine squared function at the largest value of retardation must not be less than $2\Delta\sigma_x$ if the transmission of energy associated with the line is to be zero at such largest value. Therefore, the value of the largest value of retardation is:

$$B' = \frac{1}{n\Delta\sigma_x}$$

where $n > 2$ and is preferably 3. The value of B, the smallest value of retardation which will just permit transmission of substantially 100% of the energy associated with the line, is half B' selected as above.

Apparatus for practicing the present invention whose theory is described above, is shown in FIG. 5. This embodiment shows interferometric apparatus 19 comprising a Michelson-type interferometer 20, means 21 to modulate the retardation, and means 22 to monitor changes in the amount of light produced by the fringe pattern developed by the interferometer when the retardation is modulated. Interferometer 20 includes the usual beam splitter 23 and compensating plate 24 arranged at 45° to axis 25 aligned with the radiation 26 desired to be monitored. In addition, interferometer 20 includes front surfaced mirror 27 mounted normal to axis 25 limited rectilinear movement therealong under the influence of mirror drive 28, which, when energized by A-C signal source 29 of means 21, oscillates mirror 27 between the two limits shown in the drawing to vary the retardation. Drive 28 is conventional in nature and may be in the form of an A-C excited coil wound around a movable armature on which mirror 27 is mounted.

The other optical leg of the interferometer lies along axis 30 normal to axis 25, and terminates in special compensator 31 which consists of glass plate 32 in optical contact with front surfaced mirror 33. Compensator 31 serves the purpose of increasing the optical path of leg 30 of the interferometer to increase the retardation without substantially increasing the geometric length of the arm, and at the same time, increasing the resolving power of the optical system. This dual function can be seen best by referring to FIG. 6 which is a sectional view of the compensator. Consider first the increase in optical path occasioned by one pass of the ray R through plate 32 which has a thickness $t$ and index $n$. From geometrical optics, the time $\tau$ to traverse the distance $t$ in glass is:

$$\tau = \frac{nt}{c\cos\theta_o}$$

where $c$ = velocity of light and $\theta_o$ is the angle of refraction. In the same time, the light ray could have gone a distance $t'$ where $$t' = c\tau$$

Thus, the change in path length is $$t' - t = c\tau\left(1 - \frac{1}{n}\right) = t(n-1)$$

provided $\cos\theta_o \doteq 1$.

From the geometry shown in FIG. 6, the extension of ray R into the glass, were no refraction to take place, intersects the normal to the point of incidence of the refracted ray on mirror 33 a distance $x$ from the mirror. Inspection shows:

$$(t-n)\tan\theta_i = t\tan\theta_o \quad (7)$$

wherein $\theta_i$ and $\theta_o$ are, respectively, the angles of incidence and refraction. Using the relation $$n = \frac{\sin\theta_i}{\sin\theta_o}$$

Eq. 7 reduces to:

$$x = t\left[1 - \frac{1}{n}\left(\frac{\cos\theta_i}{\cos\theta_o}\right)\right]$$

When $\theta_i$ is small, $\cos\theta_i/\cos\theta_o \doteq 1$. If mirror 27 is at its null position as established by a D-C bias applied to the coil of the mirror drive, compensator 31 can be moved axially along axis 30 until mirror 33 is a distance $x$ beyond the geometric balance of the interferometer. In such case, the total retardation of the instrument is the same as if the plate were of thickness $t+x$. Hence:

$$B = 2t(n-1) + t\left(1 - \frac{1}{n}\right) = 2t\left(\frac{n^2-1}{n}\right)$$

The effect of compensator 31 as used herein, is to substantially increase the retardation and at the same time substantially increase the resolution of the system. For example, if the retardation error between axial and off-axial rays is set equal to a half-wave, the expression for the field limit is:

$$R_w \leq \frac{1}{2}\left[\frac{n^2-1}{n(n^2-\sin^2\theta_i)^{1/2} - n^2 - \cos\theta_i + 1}\right]$$

For a half-field angle $\theta_i = 10°$ and $n = 1.5$, the resolution is improved from 36 for the ordinary Michelson instrument to 18,650 for the compensated instrument. (See L. Mertz J. Opt. Soc. Am. Advt. vol. 49, December 1959).

As was pointed out previously, the bandpass of the background that is modulated by the so-called "channeled spectra" characteristic of the interferometer must be large enough to insure that changes in the energy associated with the background and transmitted due to the modulation of the retardation will tend to zero. Conflicting somewhat with this requirement is the necessity to isolate the line of interest from other lines adjacent thereto, since the presence of any other line in the bandpass would materially affect the results. However, it has been found that a half-bandpass no less than about $20\Delta\sigma_x$ provides good results. Thus, if the half-intensity width of line 10, for a given concentration of the element whose excitation causes the line, is about 0.5 A., a bandpass of about 20 A. is satisfactory. Thus, for the line at 5218.202 angstroms, the minimum bandpass is:

$$\Delta\lambda_{min.} = \frac{\lambda^2\Delta\sigma}{10^8} = 5.5A$$

While this may not be achieved easily, it illustrates how discriminating the apparatus can be made in the presence of other lines adjacent to the line of interest. For example, if monitoring of the copper content in a melt of stainless steel were involved, the weak chromium line at 5208.436 A. would not create a problem provided the half-bandpass of the instrument were limited to less than 10 A. The bandpass characteristics are controlled by proper selection of interference filter 34 which limits the light entering the instrument to the preselected band 15.

In operation, radiation 26 enters the instrument through filter 34 and is equally divided by beam splitter 23. Light from the two optical paths is recombined on the sensitive surface of photomultiplier 35. As is conventional, the fringe pattern developed by the interferometer is focused on the photomultiplier through lens 36. The A-C signal derived from source 29 causes mirror drive 28 to oscillate mirror 27 between two limit positions selected as previously indicated to cause the periodic shift of the transmission characteristic of the interferometer. The modulated output of the photomultiplier is amplified at 37, and synchronously demodulated at 38 with a portion of the output of source 29. The output of demodulator 38 is sensitive to the phase relationship between the signal source and the output of the photomultiplier, and contains a component at the frequency of the source. The output of the demodulation is rectified and drives a D-C meter 39 calibrated in terms of intensity. The use of phase-shifting network 40 between source 29 and demodulator 38 permits the output of the latter to be maximized.

The Michelson interferometer develops interference fringes from two beams. Multibeam interference fringes can also be produced by dividing a wavefront such that the resultant beams are unequal in amplitude. A special case in which the amplitudes of successive beams are geometrically degraded is achieved with the Fabry-Perot interferometer. In this instrument, two partially reflecting parallel surfaces are provided and the transmission characteristics is of the following form:

$$I = \frac{I_o}{1 + C \sin^2\left(\frac{\delta}{2}\right)} \quad (8)$$

where $C = f$ (reflectance) and $\delta$ is the phase difference between successive beams. The phase difference is related to the parameters of the interferometer as follows:

$$\frac{\delta}{2} = \frac{2\pi}{\lambda} nt \cos \theta_n$$

where $\lambda$ is the wavelength transmitted, $n$ is the index of refraction in the medium between the surfaces, $t$ is the gap between the surfaces and $\theta_n$ is the magnitude of the angle, with respect to the surfaces, of incidence and emergence of the beams within the medium. Equation 8 plotted as a function of wavenumber resembles the curves of FIGS. 2 and 3 and the period of the maxima and minima is:

$$\Delta \sigma'_p = \left(\frac{1}{2nt \cos \theta_n}\right)$$

There are thus three parameters which can be varied to change the channel spacing. When only $t$ is varied, the resultant pattern is conventionally termed fringes of equal chromatic order. The approach to spectral line discrimination described in reference to the Michelson interferometer is applicable to multibeam interference devices of which the Fabry-Perot interferometer is an example. Using the latter type of instrument, modulation of any of the three parameters identified above should produce modulation of the line of interest.

The apparatus above described relates to interferometric apparatus constructed and arranged to produce the so-called channel spectra, but those skilled in the art will recognize that apparatus is available which can simulate the fringe field of a Michelson interferometer, although a process other than interference is involved. See for example, L. Mertz and N. O. Young, J. Opt. Soc. Am., Advt. vol. 50, November 1960 and L. Mertz, "Heterodyne Interference Spectroscopy," IC05 meeting, Stockholm, Sweden, 1959. One form of this last-mentioned apparatus is shown at 50 schematically in FIG. 7 and conveniently termed a "mock interferometer." It comprises rotatable Ronchi grating 51 mounted to overlie both the entrance and exit apertures 52 and 53 of a conventional dispersing spectrometer 54. When the rulings of the grating are parallel to the dispersion, the latter has no effect, and the transmitted beam is either a black or white moire fringe transmission. When the rulings of the grating are inclined relative to the dispersion, selective wavelengths of the beam will be transmitted. By applying a particular highly nonuniform angular velocity to the grating by way of motor drive, the resultant fringe pattern will approximate that obtained by the uniform modulation of the retardation in a Michelson interferometer. Therefore, to this extent, the "mock interferometer" used as described to simulate an interferometer is intended to be included in the class of things termed interferometric means" for generating a fringe pattern and having a wavelength transmission response in the form of a squared sinusoid.

As previously mentioned, it is desirable for optimum effectiveness of the apparatus that the line of interest be centered quite exactly between the respective maxima and minima of the channels as the retardation is varied between the two limits. It should be clear from the foregoing explanation that precisely 100% modulation of the line is achieved only when it is so centered. That is, at one limit of retardation line 10 should be centered at a minima of the channeled spectra, as shown in FIG. 2, and at the other limit of retardation the line should be centered at a maxima, as shown in FIG. 3. This condition can be made to prevail if the retardation is properly varied in one arm of the interferometer. Further, it will be understood that the period of motion of the channeled spectra is a direct function of the mirror drive as controlled by the frequency of the A-C signal source 29. If the output signal of source 29 is such that the line of interest is *not* centered at the respective maxima and minima of the channels as retardation is modulated, the signal output of the photomultiplier will not be demodulated to optimum advantage. For example, consider the case of line 10 appearing midway between a maxima and minima of a channel at one limit of retardation, rather than being centered between two channels (i.e., at a minima, as in FIG. 2). Assuming the period of motion of the channeled spectra to be the same as that required to cause relative movement with respect to the line of ½ channel, then at the other limit of retardation the line will also be midway between a maxima and minima, having passed through either a maxima or minima during modulation of the retardation. Assuming the channels to be so moved with respect to the line, graphically speaking, as to pass from 50% transmission of line intensity to zero and back to 50%, during variation from one limit of retardation to another, the signal output of the photomultiplier would then be a pure second harmonic of the fundamental or first harmonic of the fundamental or first harmonic frequency which is generated in response to 100% modulation of the line. Hence, there would be no indication whatever of a signal at meter 39 since the apparatus is arranged to demodulate the signal only at the first harmonic. A second harmonic would be present, of course, any time the line is modulated to some degree between the pure first and second harmonics described above. Again, the portion of the signal attributable to the second harmonic would not appear in the final output signal and would thus detract from optimum effectiveness of the device.

As a further refinement of the invention, means may be provided to compensate automatically for output signals of the A-C source which may produce the above-described second harmonics. Such means are shown in FIG. 5 and comprise a feedback loop from A-C signal source 29 to mirror drive 28. A conventional frequency multiplier, indicated in the block diagram at 60, is used to double the frequency of the A-C signal from source 29. The output of multiplier 60 is fed to null seeking device 61 which is calibrated to generate an output only when the signal input thereto indicates that there is a variation from the fundamental frequency desired. When such variations occur, null seeking device 61 generates an output which is applied to the drive bias of mirror drive 28 to offset the effect of the variation from the fundamental frequency. The feedback loop thus functions as a servo device, supplying an error signal to maximize amplitude at the frequency of A-C signal source 29.

Consider now the further case of a variation in the limits of retardation which shift the relative positions of the channels with respect to the line by a full rather than a half channel width. If the line appears midway between a maxima and minima at one limit of retardation it will pass through both a minima and a maxima in arriving at another midpoint at the other limit of retardation. Thus, the line intensity transmission will be modulated from 50% to zero to 100% to 50% in one period of movement of the channels, thereby giving rise to a third harmonic in the signal output of the photomultiplier. Again, since optimum efficiency is achieved only at the fundamental frequency, the presence of the third harmonic is undesirable and may be eleminated by correcting the frequency at A-C signal source 29 to maximize amplitude, i.e., to get all the power into one frequency. Amplitude control means for A-C signal source 29 are provided, as indicated in FIG. 5, and may be in the nature of a convention manual control knob. Amplitude may thus be maximized manually to change the limits of retardation until a maximum signal is visually observed on meter 39. This insures elimination of third harmonics, with the second harmonics being automatically elminated by the servo system previously described. Provision of means for eliminating second and third harmonics will also insure that no higher harmonics are present.

The range of applications of the present invention in the field to which it pertains is virtually limitless; thus, it will be apparent to those skilled in the art that many applications comprehended by the invention are not specifically enumerated. One further example of a most useful application of the invention which is believed to be of sufficient importance to warrant further discussion is that of monitoring carbon (or other impurity) content during purification of scrap metal. It has been a common practice for many years to remove substantially all impurities, notably carbon and silicon, from scrap metal by melting the scrap in an oxygen furnace, thereby thermally exciting the atoms of the non-metallic elements to the reaction state wherein they combine with the oxygen and are eliminated as waste gases. After the metal has thus been purified, it may be desirable to add predetermined amounts of some of the same, previously-removed impurities in the production of a new batch of metal under carefully controlled conditions. Obviously, an enormous saving in time and cost could be realized if the removal of impurities could be halted when the relative content of the impurity in the scrap metal is at the desired level. Consider the case of carbon, for example, which is commonly present in rather high concentrations in scrap material and which is also added to molten iron in the production of steel. The scrap is melted to free the carbon atoms by thermal excitation. Some of the free carbon atoms combine immediately with the oxygen which is supplied to the furnace to form CO and $CO_2$, while others combine with another carbon atom to form diatomic or molecular carbon. The diatomic carbon also breaks down eventually to combine with oxygen, but while it is in the diatomic state the carbon ($C_2$) emits radiation in a number of band areas, commonly known as Swan bands, which are typified by sharp band heads and tapering tails. A measurement of the intensity of radiation at one of the Swan bands may be properly correlated to provide an accurate indication of the actual carbon content of the melt at any given time. Such a measurement has heretofore been most difficult to obtain, to the point of making such practice unfeasible, since the temperature of the melt may be in excess of 2800° F. with rather large and unpredictable fluctuations. Thus, there is a great deal of black body radiation associated with the melt itself which appears as continuum background in the presence of the relatively weak Swan band. The present invention may readily be utilized, however, in accordance with the foregoing detailed disclosure, to provide a most accurate discrimination of the spectral detail of the Swan band, thereby making possible the precise correlation of the relative carbon content of the melt at any given time in the process.

Since certain changes may be made in the above methods and apparatus without departing from the scope of the invention herein involved, it is intended that all matter contained in the above description or shown in the accompanying drawings shall be interpreted as illustrative and not in a limiting sense.

What is claimed is:
1. Apparatus for detecting a relatively low intensity spectrum line having a known half-intensity width in the presence of a relatively high intensity continuum background, comprising:
  (a) light filter means whose output is a band of the spectrum surrounding said line;
  (b) a Michelson-type interferometer for dividing the output of said filter means into two beams traveling in the same direction;
  (c) means to periodically vary the difference in path length of said two beams between values $B_1$ and $B_2$ such that $B_2 = 2B_1$ and

$$B_2 = \frac{1}{n \Delta \sigma_x}$$

where $n \geq 2$ and $\Delta \sigma_x$ is the half-intensity width of said line in wavenumbers; and
  (d) means to monitor changes in the amount of radiation produced by the fringes formed by said interferometer when said difference in path length is periodically varied, whereby the intensity of said spectrum line is determined proportionally to the amplitude of said changes.

2. Apparatus in accordance with claim 1 wherein said means to monitor changes in the amount of radiation produced by the fringes comprises:
  (a) photoresponsive means on which said fringes are focused; and
  (b) means to detect changes in the output of said photoresponsive means that occur with the same periodicity as the periodicity with which said difference in path length is varied; the time-average value of said changes being proportional to the intensity of said line.

3. Apparatus in accordance with claim 2 wherein said means to detect changes in the output of said photoresponsive means includes demodulator means for synchronously demodulating the output of said photoresponsive means with an A-C signal whose period is the same as the period in which said parameter is modulated.

4. Apparatus in accordance with claim 3 and further including means responsive to the period of said A-C signal for maintaining the ratio of said path lengths at $B_1$ and $B_2$.

5. The method of separating the spectral detail of a discontinuity at a given spectrum line in a relatively high intensity continuum background, said method comprising the steps of:
  (a) transmitting radiation over a limited portion of the spectrum which includes said line and the surrounding region to impinge upon light responsive means;
  (b) modulating the intensity of said line which is transmitted to said light responsive means while maintaining the relative intensity of the transmitted portion of said continuum background substantially constant;
  (c) generating a signal in response to at least the modulated portion of said transmitted radiation; and
  (d) providing a physically observable indication of the intensity of said line responsively to said signal.

6. The method of separating the spectral detail of a discontinuity at a given spectrum line in a relatively high intensity continuum background, said method comprising the steps of:
  (a) transmitting radiation over a limited portion of the spectrum which includes said line and the surrounding region as the input to an interferometric device;
  (b) generating a fringe pattern of channeled spectra wherein the band width of the respective channels is relatively small;

(c) modulating the retardation of said interferometric means between two predetermined values; and
(d) monitoring variations in the intensity of the output of said interferometric device in accordance with the period of modulation of said retardation.

7. The method of separating the spectral detail of a discontinuity at a given spectrum line in a relatively high intensity continuum background, said method comprising the steps of:
(a) transmitting radiation over a limited portion of the spectrum which includes said line and the surrounding region as the input to an interferometric device;
(b) modulating the retardation of said interferometric means between two predetermined values;
(c) directing the output of said interferometric device to impinge upon photoresponsive means having an electrical property functionally related to the intensity of light incident thereon;
(d) said predetermined values being so chosen that the output intensity of radiation associated with said line is modulated between substantially zero and 100% synchronously with modulation of said retardation, whereby said electrical property is synchronously modulated;
(e) synchronously demodulating said electrical property with an A-C signal whose period is the same as the period in which said retardation is modulated; and
(f) monitoring the value of said demodulated electrical property.

References Cited

UNITED STATES PATENTS 3,286,582    11/1966    Mertz.

OTHER REFERENCES

The Theory, Design and Development of an Interferometric Spectrometer, R. C. Willson; Principal Investigator: W. A. Rense; AFCRL 63–688, prepared for Air Force Cambridge Research Laboratories, Office of Aerospace Research, U.S. Air Force, Bedford, Mass., July 1, 1963, pp. 1–9.

RONALD L. WIBERT, Primary Examiner

V. P. McGRAW, Assistant Examiner